US012037173B2

(12) United States Patent
Smalley

(10) Patent No.: US 12,037,173 B2
(45) Date of Patent: Jul. 16, 2024

(54) CARRIER FOR CONTAINERS

(71) Applicant: Graphic Packaging International, LLC, Atlanta, GA (US)

(72) Inventor: Brian Smalley, Bristol (GB)

(73) Assignee: Graphic Packaging International, LLC, Atlanta, GA (US)

(*) Notice: Subject to any disclaimer, the term of this patent is extended or adjusted under 35 U.S.C. 154(b) by 1054 days.

(21) Appl. No.: 16/567,340

(22) Filed: Sep. 11, 2019

(65) Prior Publication Data

US 2020/0087042 A1 Mar. 19, 2020

Related U.S. Application Data

(60) Provisional application No. 62/732,825, filed on Sep. 18, 2018.

(51) Int. Cl.
*B65D 71/58* (2006.01)
*B31B 50/26* (2017.01)
(Continued)

(52) U.S. Cl.
CPC ........ *B65D 71/0022* (2013.01); *B31B 50/262* (2017.08); *B31B 50/86* (2017.08);
(Continued)

(58) Field of Classification Search
CPC ...... B65D 71/0022; B65D 2571/00382; B65D 2571/00524; B65D 2571/00141;
(Continued)

(56) References Cited

U.S. PATENT DOCUMENTS 2,384,480 A * 9/1945 Lupton .............. B65D 71/0037 229/117.14
2,844,281 A * 7/1958 Ringler .............. B65D 71/0022 206/191

(Continued)

FOREIGN PATENT DOCUMENTS

WO WO 02/28740 A1 4/2011

OTHER PUBLICATIONS

Supplementary European Search Report for EP 19 86 1555 dated Apr. 26, 2022.

(Continued)

*Primary Examiner* — J. Gregory Pickett
*Assistant Examiner* — Jenine Pagan
(74) *Attorney, Agent, or Firm* — Womble Bond Dickinson (US) LLP

(57) ABSTRACT

A carrier for holding a plurality of containers includes a plurality of panels extending at least partially around an interior of the carrier, the plurality of panels includes a front panel, a back panel, a first side panel, and a second side panel. The carrier also includes a central partition that divides the carrier into a front portion and a back portion, with each of the front portion and the back portion having at least one divider flap to divide the front portion and the back portion into respective compartments for receiving a respective article. The carrier also includes a plurality of reinforcement flaps foldably connected to a respective panel of the plurality of panels, the plurality of reinforcement flaps includes at least one divider reinforcement flap reinforcing the at least one divider flap.

33 Claims, 8 Drawing Sheets

(51) Int. Cl.

| | |
|---|---|
| ***B31B 50/86*** | (2017.01) |
| *B31B 50/25* | (2017.01) |
| *B31B 50/62* | (2017.01) |
| *B31B 50/73* | (2017.01) |
| *B31B 50/81* | (2017.01) |
| *B31B 110/35* | (2017.01) |
| *B31B 120/20* | (2017.01) |
| *B31B 120/30* | (2017.01) |
| *B31B 120/40* | (2017.01) |

(52) U.S. Cl.

CPC ............. *B31B 50/25* (2017.08); *B31B 50/624* (2017.08); *B31B 50/73* (2017.08); *B31B 50/81* (2017.08); *B31B 2110/35* (2017.08); *B31B 2120/20* (2017.08); *B31B 2120/302* (2017.08); *B31B 2120/40* (2017.08); *B31B 2241/001* (2013.01); *B65D 2571/00382* (2013.01); *B65D 2571/00524* (2013.01)

(58) Field of Classification Search

CPC .. B65D 2571/00487; B65D 2571/0066; B65D 2571/00802; B65D 2571/00839; B65D 2571/00851

USPC ......................................... 206/198, 195, 196

See application file for complete search history.

(56) References Cited

U.S. PATENT DOCUMENTS

| | | | | | |
|---|---|---|---|---|---|
| 2,857,077 | A | | 10/1958 | Gaa | |
| 3,010,604 | A | * | 11/1961 | Arneson | B65D 71/0022 206/186 |
| 3,029,977 | A | * | 4/1962 | Arneson | B65D 71/0077 206/187 |
| 3,093,265 | A | * | 6/1963 | Arneson | B65D 71/0022 206/184 |
| 3,229,849 | A | * | 1/1966 | Spillson | B65D 71/0077 D9/753 |
| 3,355,012 | A | * | 11/1967 | Weiss | B65D 5/48036 206/200 |
| 3,924,740 | A | | 12/1975 | Wood | |
| 4,205,748 | A | * | 6/1980 | Wilson | B65D 71/0022 206/188 |
| 4,319,682 | A | | 3/1982 | Wright et al. | |
| 4,453,664 | A | * | 6/1984 | Oliff | A63F 3/069 283/105 |
| 4,505,696 | A | * | 3/1985 | Wright | B65D 71/0022 493/151 |
| 4,605,464 | A | | 8/1986 | Slevin | |
| 4,770,294 | A | | 9/1988 | Graser | |
| 5,547,074 | A | | 8/1996 | Plaxico et al. | |
| 5,941,377 | A | | 8/1999 | Hart et al. | |
| 5,947,273 | A | | 9/1999 | Dalrymple et al. | |
| 6,131,729 | A | | 10/2000 | Eckermann et al. | |
| 6,202,836 | B1 | | 3/2001 | Picciolo | |
| 6,230,881 | B1 | | 5/2001 | Collura | |
| 6,371,287 | B1 | | 4/2002 | Jones et al. | |
| 7,134,547 | B2 | * | 11/2006 | Auclair | B65D 71/0022 206/196 |
| 7,677,387 | B2 | | 3/2010 | Brand et al. | |
| 7,793,780 | B2 | | 9/2010 | Smalley | |
| 8,020,695 | B2 | | 9/2011 | Brand | |
| 8,297,437 | B2 | | 10/2012 | Smalley et al. | |
| 8,424,677 | B2 | | 4/2013 | Spivey, Sr. et al. | |
| 8,511,463 | B2 | | 8/2013 | Brand | |
| 8,622,207 | B2 | | 1/2014 | Smalley | |
| 8,869,979 | B2 | | 10/2014 | Smalley | |
| 8,936,149 | B2 | | 1/2015 | Smalley | |
| 9,061,809 | B2 | | 6/2015 | Wilkins et al. | |
| 9,415,914 | B2 | | 8/2016 | Holley, Jr. | |
| 10,287,073 | B2 | | 5/2019 | Zammit et al. | |
| 10,301,090 | B2 | | 5/2019 | Holley, Jr. | |
| 10,518,951 | B2 | | 12/2019 | Holley, Jr. | |
| 2002/0117407 | A1 | | 8/2002 | Holley, Jr. | |
| 2016/0176594 | A1 | | 6/2016 | Holley, Jr. | |
| 2017/0327266 | A1 | * | 11/2017 | Zacherle | B65D 5/4266 |

OTHER PUBLICATIONS

International Search Report and Written Opinion for PCT/US2019/050550 dated Dec. 30, 2019.

* cited by examiner

CARRIER FOR CONTAINERS

CROSS-REFERENCE TO RELATED APPLICATION

This application claims the benefit of U.S. Provisional Patent Application No. 62/732,825 which was filed on Sep. 18, 2018.

INCORPORATION BY REFERENCE

The disclosure of U.S. Provisional Patent Application No. 62/732,825, which was filed on Sep. 18, 2018, is hereby incorporated by reference for all purposes as if presented herein in its entirety.

BACKGROUND OF THE DISCLOSURE

The present disclosure generally relates to carriers for holding articles therein. In particular, the present disclosure is directed to a carrier having various dividers, partitions, features, panels, reinforcement features, and/or other features as shown and/or described herein.

SUMMARY OF THE DISCLOSURE

According to one aspect of the disclosure, a carrier for holding a plurality of containers comprises a plurality of panels extending at least partially around an interior of the carrier, the plurality of panels comprises a front panel, a back panel, a first side panel, and a second side panel. The carrier further comprises a central partition that divides the carrier into a front portion and a back portion, with each of the front portion and the back portion having at least one divider flap to divide the front portion and the back portions into respective compartments for receiving a respective article. The carrier further comprises a plurality of reinforcement flaps foldably connected to a respective panel of the plurality of panels, the plurality of reinforcement flaps comprises at least one divider reinforcement flap reinforcing the at least one divider flap.

According to another aspect of the disclosure, a blank for forming a carrier for holding a plurality of containers comprises a plurality of panels for extending at least partially around an interior of the carrier formed from the blank, the plurality of panels comprises a front panel, a back panel, a first side panel, a second side panel, and at least one handle panel. The blank further comprises at least one divider flap foldably connected to the at least one handle panel, and a plurality of reinforcement flaps foldably connected to a respective panel of the plurality of panels, the plurality of reinforcement flaps comprises at least one divider reinforcement flap for being positioned in at least partial face-to-face contact with the at least one divider flap when the carrier is formed from the blank.

According to another aspect of the disclosure, a method of forming a carrier for holding a plurality of containers comprises obtaining a blank comprising a plurality of panels comprising a front panel, a back panel, a first side panel, a second side panel, and at least one handle panel, the blank further comprising at least one divider flap foldably connected to the handle panel, the blank further comprises a plurality of reinforcement flaps foldably connected to a respective panel of the plurality of panels, the plurality of reinforcement flaps comprises at least one divider reinforcement flap. The method further comprises folding the plurality of panels at least partially around an interior of the carrier, and positioning the at least one divider reinforcement flap in at least partial face-to-face contact with the at least one divider flap.

BRIEF DESCRIPTION OF THE DRAWINGS

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

According to common practice, the various features of the drawings discussed below are not necessarily drawn to scale. Dimensions of various features and elements in the drawings may be expanded or reduced to more clearly illustrate the embodiments of the disclosure.

Corresponding parts may be designated by corresponding reference numbers throughout the drawings.

DETAILED DESCRIPTION OF THE EXEMPLARY EMBODIMENTS

The present disclosure generally relates to carriers, packages, constructs, sleeves, cartons, or the like, for holding and displaying containers such as jars, bottles, cans, etc. The containers can be used for packaging food and beverage products, for example. The containers can be made from materials suitable in composition for packaging the particular food or beverage item, and the materials include, but are not limited to, glass; plastics such as PET, LDPE, LLDPE, HDPE, PP, PS, PVC, EVOH, and Nylon; and the like; aluminum and/or other metals; or any combination thereof.

Carriers according to the present disclosure can accommodate containers of numerous different shapes. For the purpose of illustration and not for the purpose of limiting the scope of the disclosure, the following detailed description describes beverage containers (e.g., glass bottles) at least partially disposed within the carrier embodiments. In this specification, the terms "lower," "bottom," "upper," "top," "front," and "back" indicate orientations determined in relation to fully erected carriers.

As described herein, carriers can be formed by multiple overlapping portions, panels, and/or flaps. Such portions, panels, and/or flaps can be designated in relative terms to one another, e.g., "first", "second", "third", etc., in sequential or non-sequential reference, without departing from the disclosure.

Figure 1:
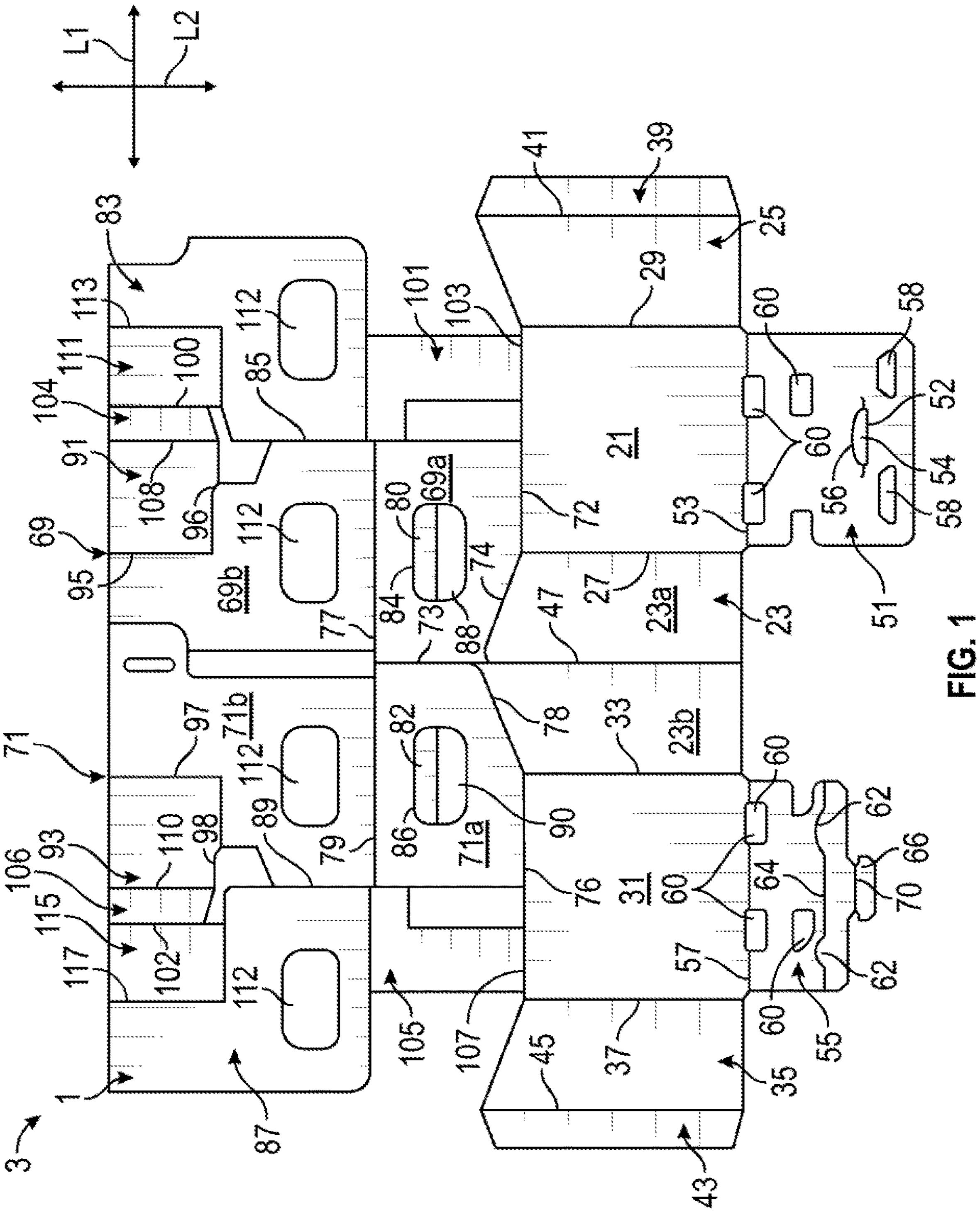
FIG. 1 is a plan view of a blank for forming a carrier according to an exemplary embodiment of the disclosure.

FIG. 1 is a plan view of the exterior side 1 of a blank, generally indicated at 3, that can be obtained and used to form a carton or carrier 5 (FIG. 6) according to a first exemplary embodiment of the disclosure. As shown, in FIG. 1, the blank 3 has a longitudinal axis L1 and a lateral axis L2. The blank 3 comprises a front panel 21 foldably connected to a first side panel 23 and a second side panel portion 25 at respective lateral fold lines 27, 29. A back panel 31 is foldably connected to the first side panel 23 at a lateral fold line 33. A second side panel portion 35, as shown, is foldably connected to the back panel 31 at a lateral fold line 37. A panel attachment flap or attachment flap 39 is foldably connected to the second side panel portion 25 at a lateral fold line 41, and a panel attachment flap or attachment flap 43 is foldably connected to the second side panel portion 35 at a lateral fold line 45.

The first side panel 23, as shown, includes two side panel portions 23*a*, 23*b* that are foldably connected at a lateral fold line 47. As described further herein, the second side panel portions 25, 35 cooperate to form a second side panel 36 of the carrier 5 that is positioned opposite the first side panel 23.

In the exemplary embodiment shown in FIG. 1, a first bottom end flap 51 is foldably connected to the front panel 21 at a longitudinal fold line 53, and a second bottom end flap 55 is foldably connected to the back panel 31 at a longitudinal fold line 57. In one embodiment, the first bottom end flap 51 includes female locking features that receive corresponding male locking features of the second bottom end flap 55.

The female locking features of the first bottom end flap 51 can include a slit 52 that partially defines an opening flap 54 foldably connected to the bottom end flap 51 along a curved fold line 56, and the female locking features can further comprise openings 58. Additional openings or apertures 60 can be provided in the bottom end flap 51, for example, for ventilation, drainage of condensation or other moisture, and/or to provide visibility to bottom portions of containers held in the carrier 5.

The male locking features of the second bottom end flap 55 can include primary locking tab projections 62 that are at least partially defined along a line of weakening 64 in the bottom end flap 55, as shown. The locking tab projections 62 can be formed by curved or angled portions of the line of weakening 64. The primary locking tab projections 62 are at least partially insertable through the openings 58 in the first bottom end flap 51. The male locking features of the second bottom end flap 55 also include a secondary locking tab projection 66 that is foldably connected to the bottom end flap 55 at a fold line 70 and is at least partially insertable through the slit 52 and/or an opening formed by the opening flap 54 of the first bottom end flap 51. The second bottom end flap 55 can also include the additional openings or apertures 60 as described above.

The bottom of the carrier 5 could be closed by other features of the end flaps 51, 55 could be otherwise shaped, arranged, configured, and/or omitted without departing from the disclosure.

As also shown in FIG. 1, a first handle panel 69 is foldably connected to a second handle panel 71 at a lateral fold line 73 that is collinear with the fold line 47. The handle panel 69 is separable from the front panel 21 at a longitudinal line of weakening 72 that intersects an oblique line of weakening 74 at which the handle panel 69 is separable from the side panel portion 23A. Similarly, the handle panel 71 is separable from the back panel 31 and the side panel portion 23*b* at a respective intersecting longitudinal line of weakening 76 and oblique line of weakening 78.

Each of the handle panels 69, 71 includes a respective handle portion 69*a*, 71*a* and a respective reinforcement portion 69*b*, 71*b* foldably connected to the respective handle portion 69*a*, 71*a* at a respective longitudinal fold line 77, 79. A first handle reinforcement flap 83 is foldably connected to the first handle panel 69 at a lateral fold line 85. A second handle reinforcement flap 87 is foldably connected to the second handle panel 71 at a lateral fold line 89.

As shown, respective handle flaps 80, 82 can be foldably connected to the respective handle portions 69*a*, 71*a* at respective longitudinal fold lines 84, 86, and extend into respective handle openings 88, 90. The handle openings 88, 90 can be positioned to align with handle openings 112 in the respective handle reinforcement flaps 83, 87 and reinforcement portions 69*b*, 71*b* upon formation of the carrier 5, as described further herein.

The reinforcement portions 69*b*, 71*b* of the first and second handle panels 69, 71 each include a divider flap 91, 93 respectively foldably connected to the respective reinforcement portion 69*b*, 71*b* at a respective lateral fold line 95, 97. The divider flaps 91, 93 are separable from the respective reinforcement portions 69*b*, 71*b* at respective generally longitudinally-extending cuts 96, 98, and the divider flaps 91, 93 are separated from respective divider reinforcement flaps 111, 115 (discussed further below) at respective lateral cuts 100, 102. As also shown, divider attachment flaps or attachment flaps 104, 106 are foldably connected to the respective divider flaps 91, 93 at respective lateral fold lines 108, 110. The handle panels 69, 71 and handle reinforcement flaps 83, 87 could be otherwise shaped, arranged, configured, and/or omitted without departing from the disclosure.

Still referring to FIG. 1, a first or front reinforcement flap 101 is foldably connected to the front panel 21 at a longitudinal fold line 103. Similarly, a second or back reinforcement flap 105 is foldably connected to the back panel 31 at a longitudinal fold line 107. A first or front divider reinforcement flap 111 is foldably connected to the first handle reinforcement flap 83 at a lateral tear line 113, and a second or back divider reinforcement flap 115 is foldably connected to the second handle reinforcement flap 87 at a lateral tear line 117. In this regard, the divider reinforcement flaps 111, 115 are foldably connected to the respective handle panels 69, 71 via the respective handle reinforcement flaps 83, 87. The reinforcement flaps 83, 87, 101, 105, 111, 115 could be otherwise shaped, arranged, configured, and/or omitted without departing from the disclosure.

Figure 2:
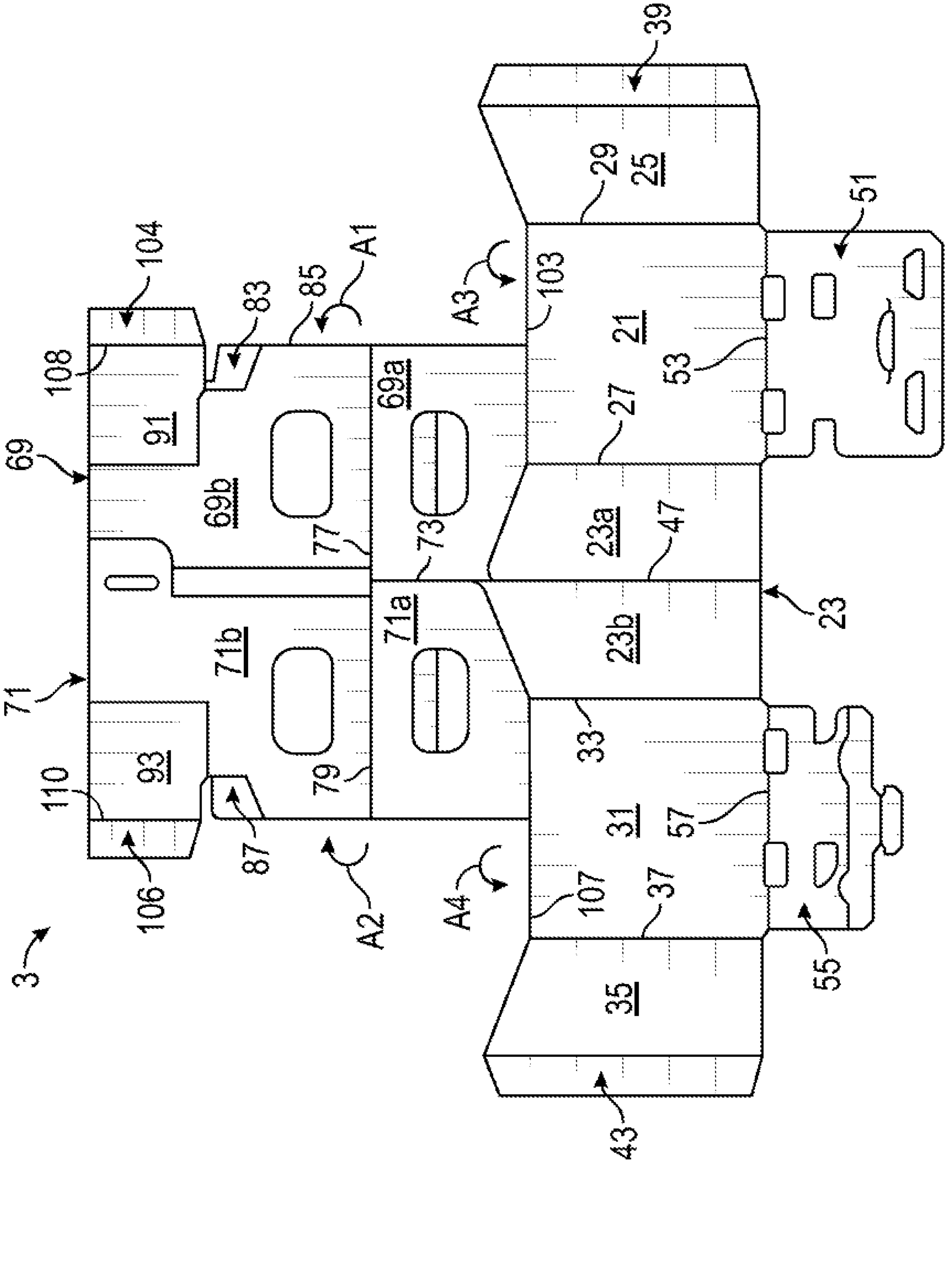
FIG. 2 is a plan view of a partially-folded configuration of the blank of FIG. 1.

Still referring to FIG. 1, and referring additionally to FIGS. 2-6, formation of the carrier 5 from the blank 3 according to one exemplary embodiment of the disclosure will be described. As shown in FIG. 2, the first handle reinforcement flap 83 and the second handle reinforcement flap 87 are folded at respective lateral fold lines 85, 89 in the direction of the respective arrows A1, A2 to be in at least partial face-to-face contact with a respective reinforcement portion 69*b*, 71*b* of a respective handle panel 69, 71. Simultaneously or thereafter, the front reinforcement flap 101 and the back reinforcement flap 105 can be folded at respective longitudinal fold lines 103, 107 in the direction of the respective arrows A3, A4 to be in at least partial face-to-face contact with a respective front panel 21 and back panel 31.

Figure 3:
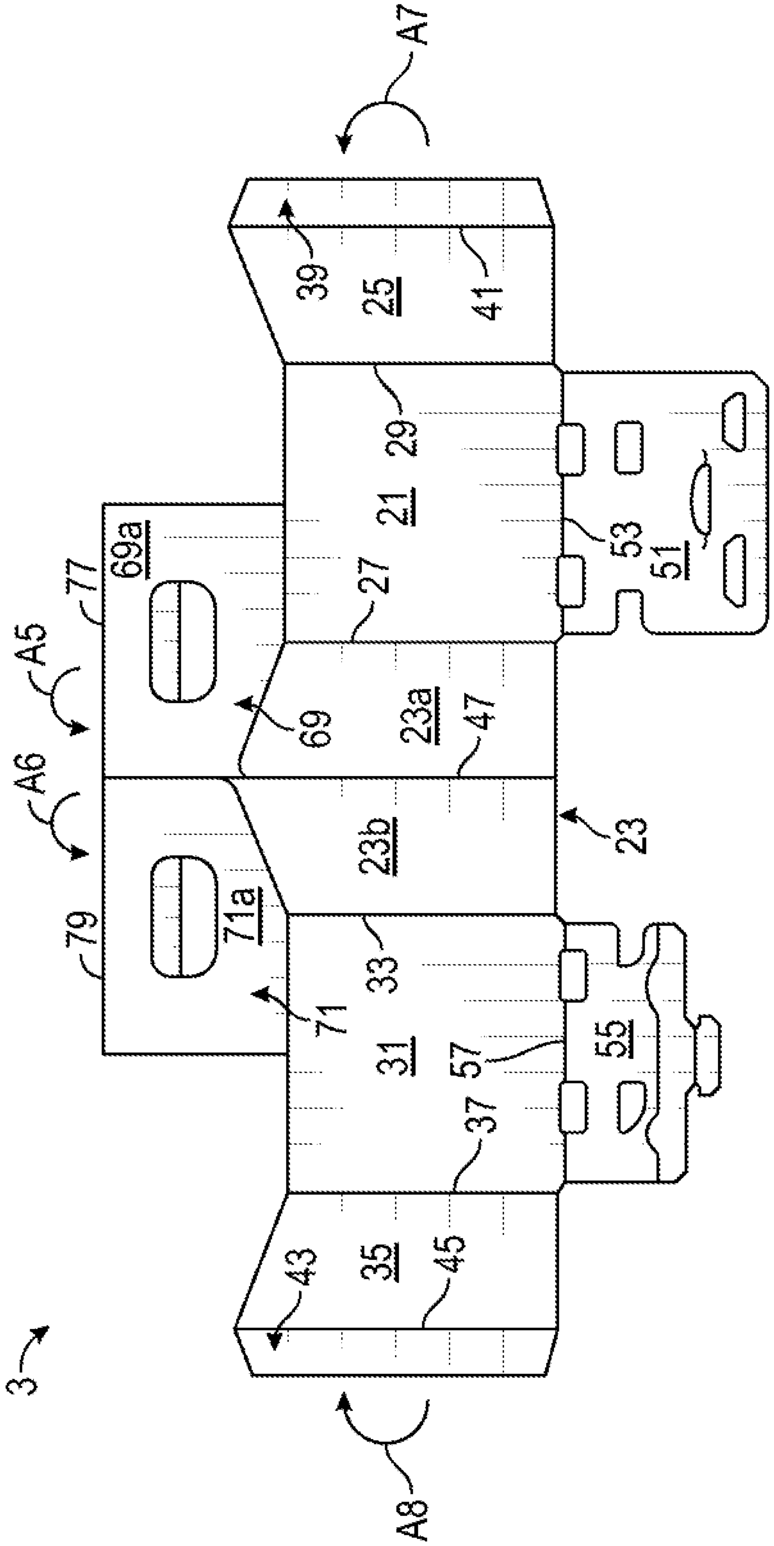
FIG. 3 is another plan view of a partially-folded configuration of the blank of FIG. 1.

As shown in FIG. 3, the first handle reinforcement portion 69*b* with the overlapped handle reinforcement flap 83 can be folded at longitudinal fold line 77 in the direction of the arrow A5 so that the handle portion 69*a* of the first handle panel 69 overlaps the first handle reinforcement flap 85 and the first handle reinforcement portion 69*b*. Similarly, the second handle reinforcement portion 71*b* with the overlapped handle reinforcement flap 87 can be folded at longitudinal fold line 79 in the direction of the arrow A6 so that the handle portion 71*a* of the second handle panel 71 overlaps the first handle reinforcement flap 87 and the second handle reinforcement portion 71*b*.

Figure 4:
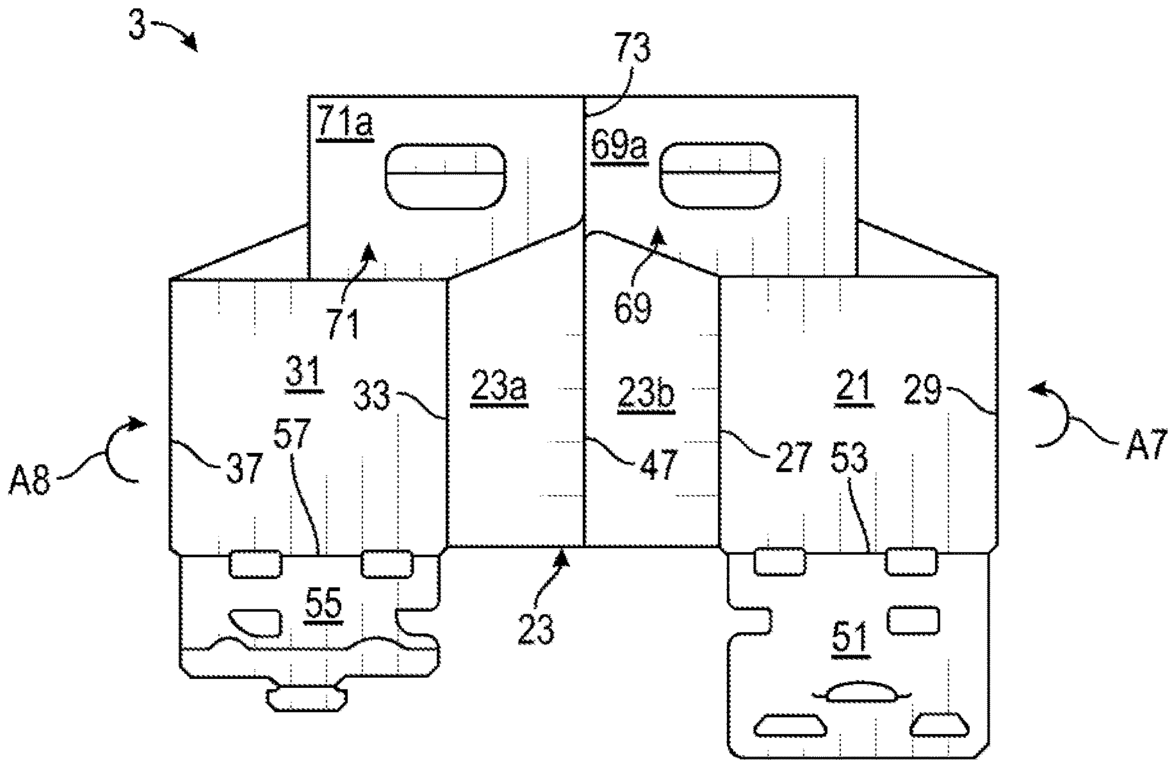
FIG. 4 is another plan view of a partially-folded configuration of the blank of FIG. 1.

Referring additionally to FIG. 4, the attachment flaps 39, 43 can be folded at the respective fold lines 41, 45 in the direction of the respective arrows A7, A8 into at least partial face-to-face contact with the respective panel portions 25, 35, and the second side panel portions 25, 35 can be folded at the respective lateral fold lines 29, 37 in the direction of the respective arrows A7, A8 into at least partial face-to-face contact with the respective front panel 21 and back panel 35 (and the respective reinforcement flaps 101, 105 overlapped thereon).

Figure 5:
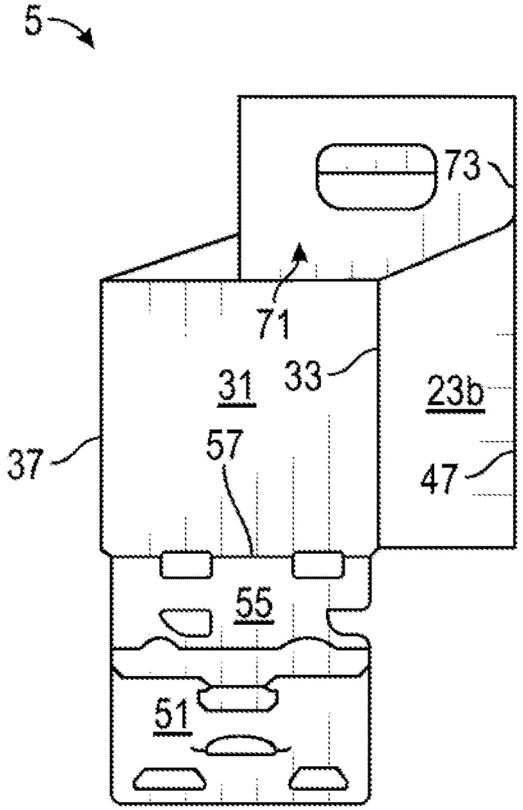
FIG. 5 is a plan view of a partially-folded configuration of a carrier formed from the blank of FIG. 1 according to the exemplary embodiment of the disclosure.

The partially-folded blank 3 can be further folded at the lateral fold line 47 between the second side panel portions 23*a*, 23*b* and the lateral fold line 73 between the two handle panels 69, 71 to provide the arrangement illustrated in FIG. 5. Such an arrangement can at least partially maintained with one or more applications of adhesive, for example, glue.

In this regard, in one embodiment, the divider attachment flap 104 can be adhered to the front panel 21, the divider attachment flap 106 can be adhered to the back panel 31, and the panel attachment flaps 39, 43 can be adhered in at least partial-face-to-face contact between the overlapped panel portions 25, 35.

Figure 6:
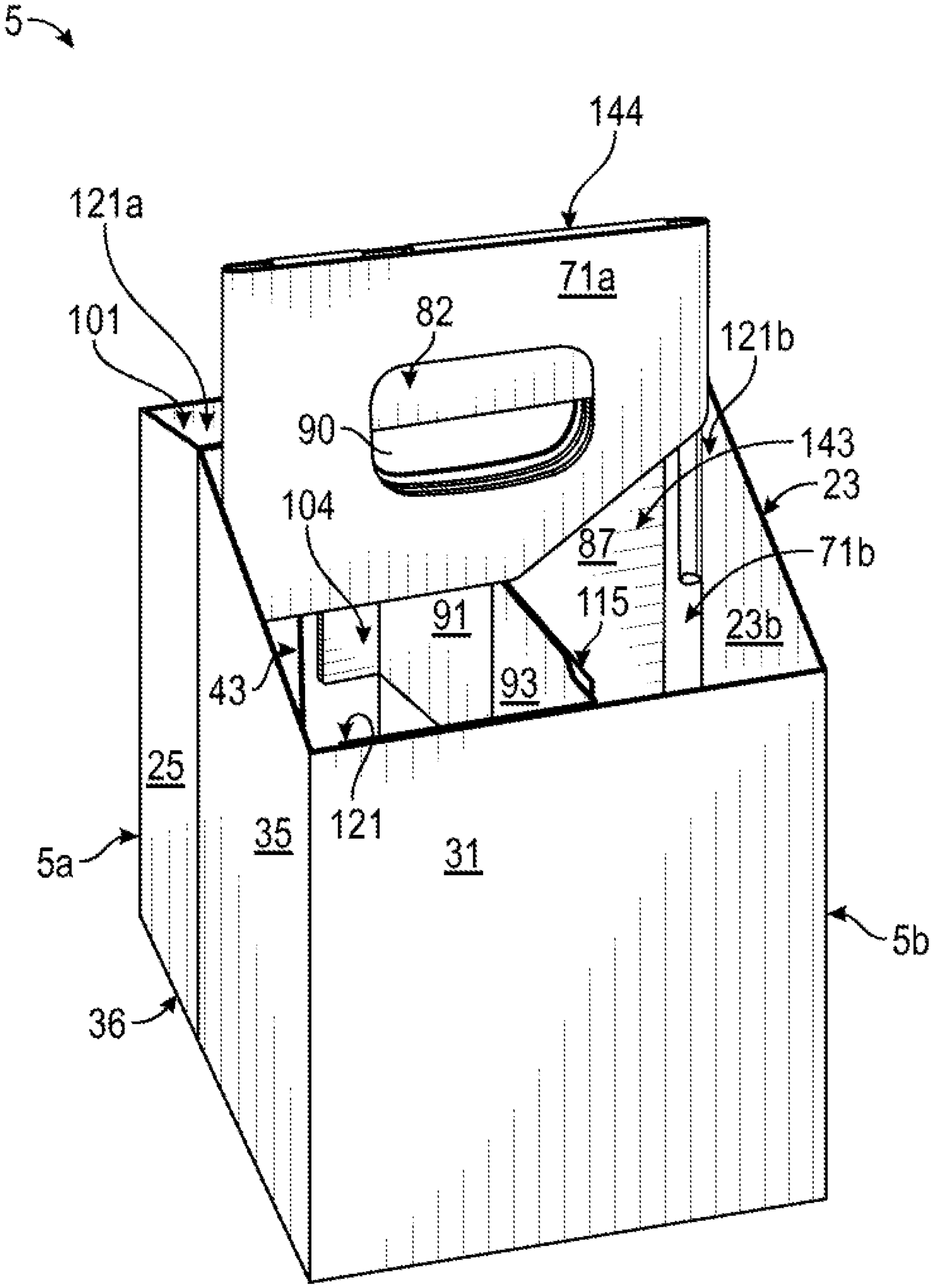
FIG. 6 is a perspective view of the carrier of FIG. 5 in an erected configuration.

The interior space 121 of the carrier 5 is formed from the folded configuration illustrated in FIG. 6 by positioning the front panel 21 and the back panel 31 in a parallel, spaced-apart planar relationship, with the side panel 23 and the side panel 36 (which is formed from the joined side panel portions 25, 35 via the adhesion of the attachment flaps 39, 43 to one another) extending between the front panel 21 and the back panel 31 to form four sides of the carrier 5.

In addition, the bottom end flaps 51, 53 can be folded toward one another at the respective fold lines 53, 57 and positioned such that the locking tab projections 62 of the bottom end flap 55 are at least partially inserted through the openings 58 of the bottom end flap 51, and such that the locking tab projection 66 of the bottom end flap 55 is at least partially inserted through an opening formed by the opening flap 54 of the bottom end flap 51 to form a closed bottom of the carrier 5.

Figure 7:
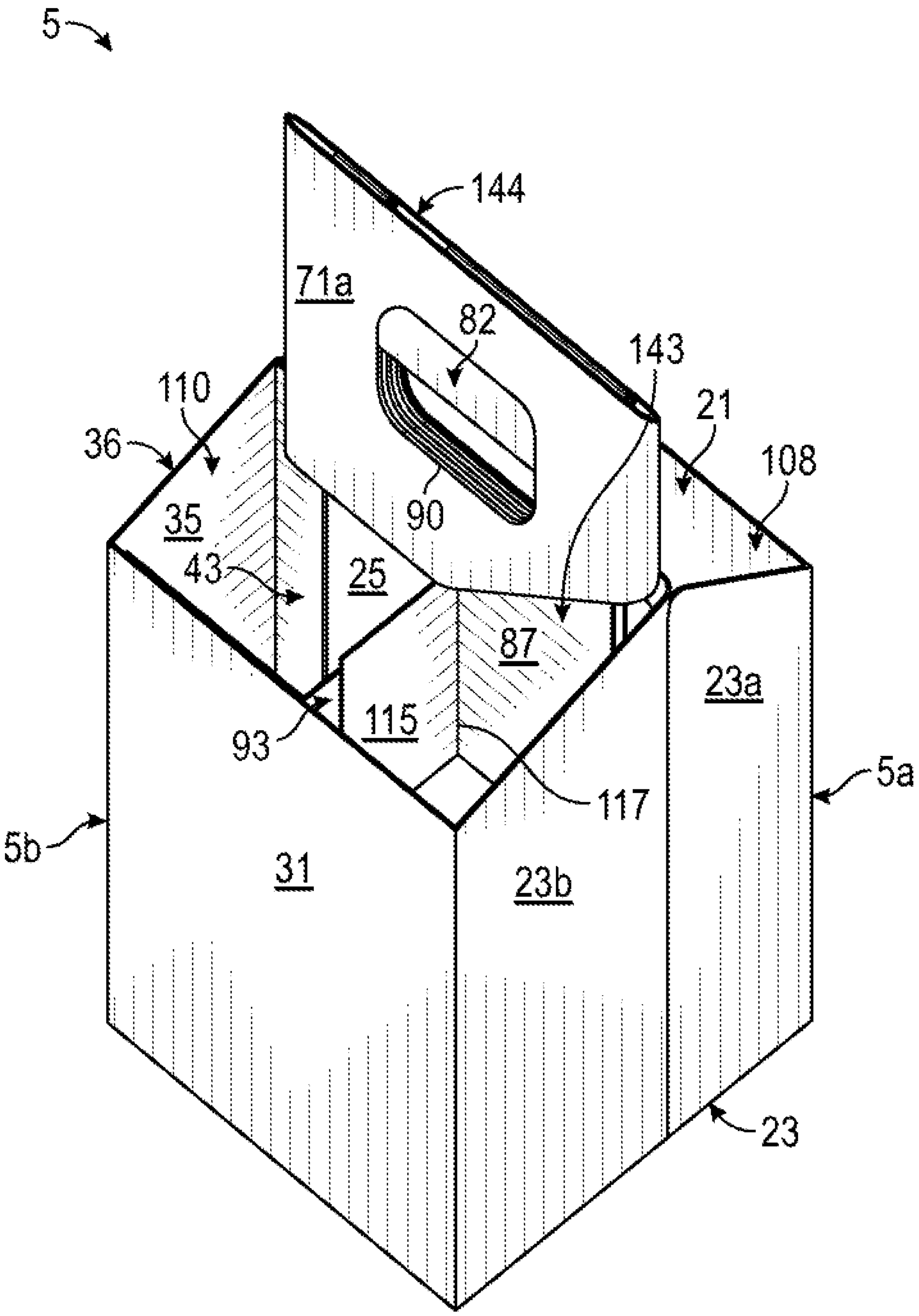
FIG. 7 is another perspective view of the carrier of FIG. 6.
Figure 8:
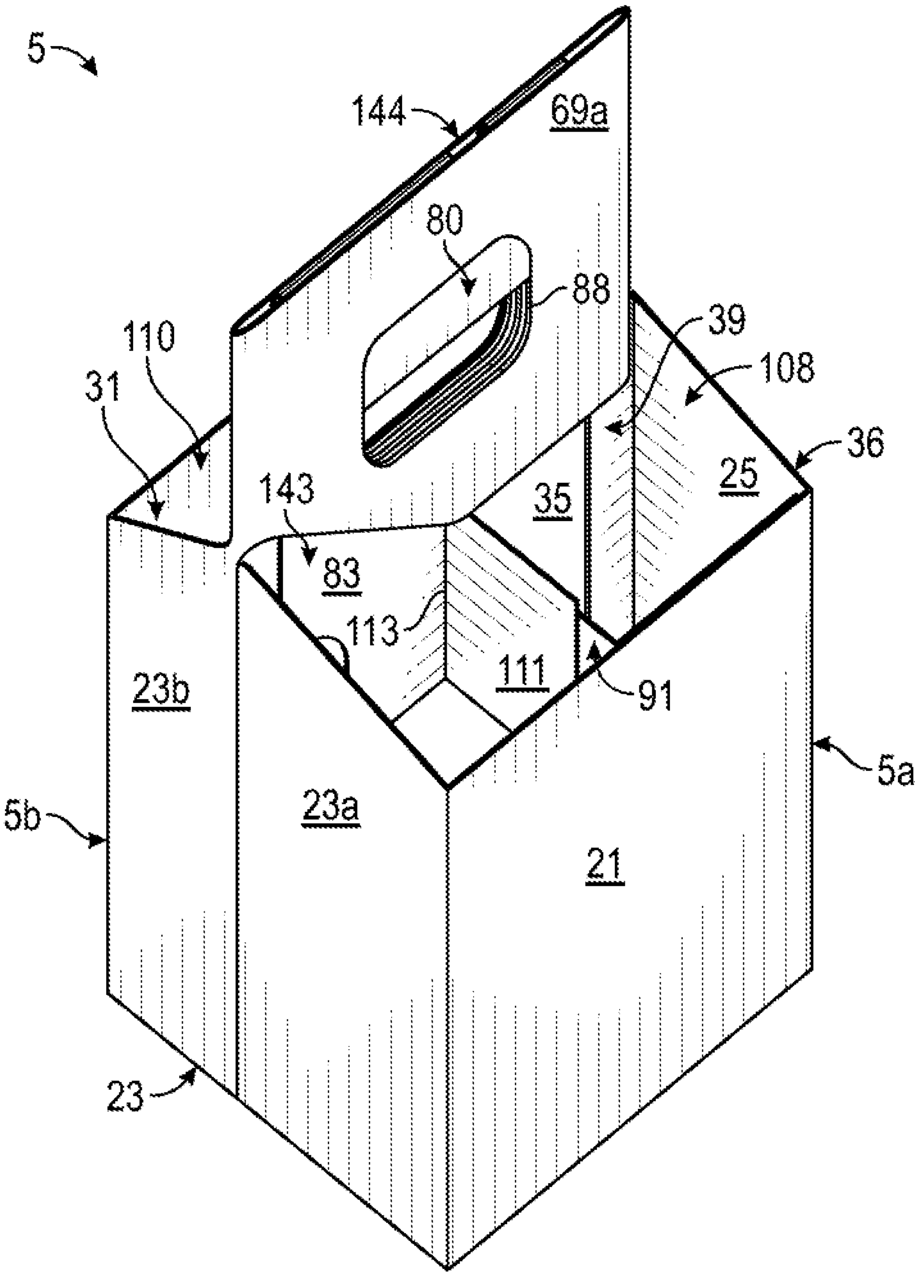
FIG. 8 is another perspective view of the carrier of FIG. 6.

As shown in FIGS. 6-8, the carrier 5 includes a central panel or central partition 143 formed from overlapped, e.g., in at least partial face-to-face contact, lower portions of the respective handle reinforcement portions 71*a*, 71*b* and handle reinforcement flaps 83, 85, e.g., in a multiply arrangement that provides rigidity and reinforcement to the arrangement of the carrier 5. The overlapped panel attachment flaps 39, 47 can also be at least partially disposed between plies of a handle 144 (described further below) of the carrier 5, and respective lower portions thereof can form a portion of the central partition 143.

Accordingly, upon formation of the carrier 5, the handle portions 69*a*, 71*a* separate from the front panel 21, the back panel 31, and the first side panel 23 at the respective lines of weakening 72, 76, and 74, 78 such that the central partition 143 extends from the first side panel 23 to the second side panel 36 and divides the carrier 5 into a front portion 5*a* defining a front interior space 121*a* and a back portion 5*b* defining a back interior space 121*b*. As described above, the divider flaps 91, 93 extend from the central partition 143 to the respective front panel 21 and back panel 31 and are adhered thereto at the respective divider attachment flaps 104, 106 to divide the respective front portion 5*a* and back portion 5*b* of the carrier 5 into respective container-receiving spaces 108, 110 for receiving respective containers through the open top of the carrier 5.

A handle 144, as shown, can extend upwardly from the carrier 5 and can include a six-ply of material including the overlapped handle portions 69*a*, 71*a*, the reinforcement portions 69*b*, 71*b*, and the handle reinforcement flaps 83, 87. Such a multi-ply arrangement of the handle 144 provides the carrier 5 with a robust structure by which a customer can grasp and carry the carrier 5 and any containers supported therein. In one embodiment, a customer can insert his or her fingers through the aligned handle openings 88, 90 and curl his or her fingers to fold the handle flaps 80, 82 at the respective fold lines 84, 86 to provide additional reinforcing structure for gripping the handle 144, e.g., in an eight-ply arrangement.

As also shown, the front reinforcement flap 101 can be adhered in face-to-face contact with the front panel 21 to reinforce the front panel 21, e.g., to resist flexion, bowing, or other deformation therealong, and/or to provide additional cushioning to containers in the carrier 5. The back reinforcement flap 105 can similarly be adhered to the back panel 31 in face-to-face contact with the back panel to reinforce the back panel 21.

As described above, the front divider reinforcement flap 111 is foldably connected to the handle reinforcement flap 83 and is free to be folded away from the central partition 143 and positioned in at least partial face-to-face contact with the divider flap 91 as shown, to provide reinforcement to the divider flap 91 and to provide additional cushioning and protection between containers in the adjacent container-receiving spaces 108. The back divider reinforcement flap 115 is similarly arranged and is positionable to be in face-to-face contact with the divider flap 93 to provide reinforcement thereto and additional cushioning and protection between containers in the adjacent container-receiving spaces 110.

Figure 9:
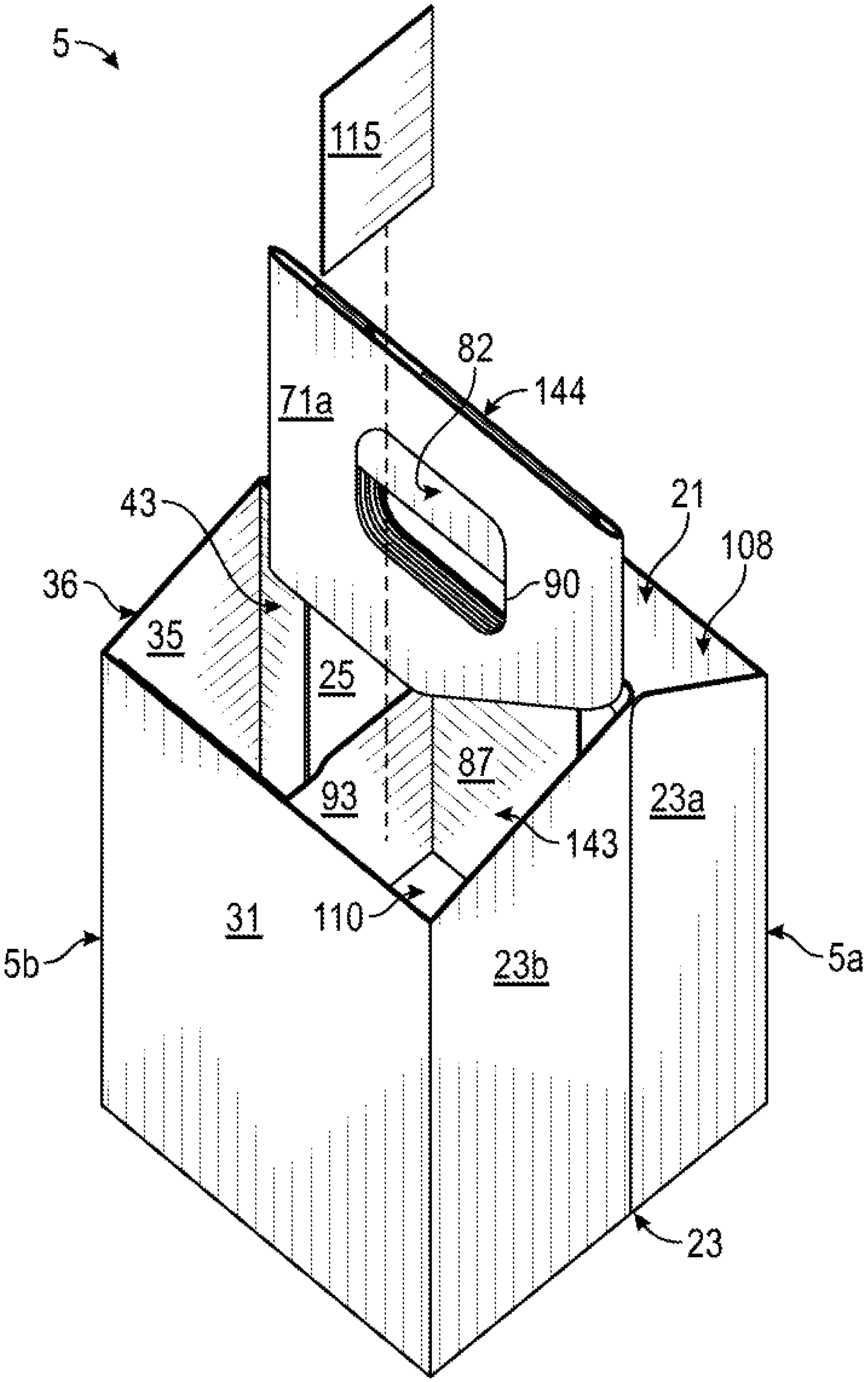
FIG. 9 is a perspective view of the carrier of FIG. 6 with a voucher removed therefrom.

In one embodiment, as shown in FIG. 9, one or both of the divider reinforcement flaps 111, 115 can be moved be moved or detached from the carrier 5, e.g., after removal of the container from the respective container receiving space 108, 110 adjacent the respective divider reinforcement flap 111, 115. In this regard, one or both of the divider reinforcement flaps 111, 115 can be separated from the central partition 143 at the respective tear lines 113, 117 and removed by a customer such that one or both of the divider reinforcement flaps 111, 115 can provide a voucher (broadly, "first voucher" and "second voucher", respectively) that includes printed indicia such as a gift token, coupon, rebate, encoded data payload (e.g., two-dimensional barcode or matrix barcode), other redeemable information, or other advertisement or information.

As described herein, one or both of the divider reinforcement flaps 111, 115 can be provided as an integrally-formed component of the carrier 5 that is optionally removable by a customer. Such an arrangement can obviate the need for separately attaching or inserting a voucher during or following assembly of a carrier. Furthermore, the initial attachment of the divider reinforcement flaps 111, 115 (prior to removal by a customer) secures these components in place as compared to, for example, a conventional loose voucher that is inserted in a carrier and that can inadvertently fall from or slip away from a carrier, shift to a positioned obscured from viewing by a customer, etc.

The carrier 5 can be formed by other method steps and other folding arrangements or sequences without departing from the disclosure.

Any of the features of the various embodiments of the disclosure can be combined with, replaced by, or otherwise configured with other features of other embodiments of the disclosure without departing from the scope of this disclosure. Further, the panels, flaps, and/or other features shown and described in conjunction with the blanks could be otherwise shaped, arranged, and/or configured without departing from the disclosure.

The carriers according to the present disclosure can be, for example, formed from blanks of coated paperboard and similar materials. For example, the interior and/or exterior sides of the blanks can be coated with a clay coating. The clay coating may then be printed over with product, advertising, price coding, and other information or images. The blanks may then be coated with a varnish to protect any information printed on the blank. The blanks may also be coated with, for example, a moisture barrier layer, on either or both sides of the blank. In accordance with the above-described embodiments, the blanks may be constructed of paperboard of a caliper such that it is heavier and more rigid than ordinary paper. The blanks can also be constructed of other materials, such as cardboard, hard paper, or any other material having properties suitable for enabling the carrier to function at least generally as described herein. The blanks can also be laminated or coated with one or more sheet-like materials at selected panels or panel sections.

As described herein, a line of weakening can include a fold line and/or a tear line, or another line of weakened structure on or adjacent a blank/carrier.

In accordance with the above-described embodiments of the present disclosure, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed portion in the material along the desired line of weakness; a cut that extends partially into a material along the desired line of weakness, and/or a series of cuts that extend partially into and/or completely through the material along the desired line of weakness; and various combinations of these features.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

The above embodiments may be described as having one or more panels, flaps, or features, adhered together by glue during erection of the carrier embodiments. The term "glue" is intended to encompass all manner of adhesives commonly used to secure carrier panels in place.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments that are within the scope of the claims. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A carrier for holding a plurality of containers, the carrier comprising:

a plurality of panels extending at least partially around an interior of the carrier, the plurality of panels comprises a front panel, a back panel, a first side panel, a second side panel, and at least one handle panel comprising a handle portion foldably connected to a handle reinforcement portion;

a central partition that divides the carrier into a front portion and a back portion, with each of the front portion and the back portion having at least one divider flap extending to the respective front panel and back panel to divide the front portion and the back portion into respective compartments for receiving a respective article, the central partition comprises a respective portion of the at least one handle panel;

a plurality of reinforcement flaps foldably connected to a respective panel of the plurality of panels, the plurality of reinforcement flaps comprises a handle reinforcement flap foldably connected to the at least one handle panel and at least one divider reinforcement flap overlapping and reinforcing the respective at least one divider flap; and a handle in the central partition, the handle comprising the handle reinforcement portion and the handle portion of the at least one handle panel and the handle reinforcement flap in overlapping relation, the handle reinforcement flap positioned between the handle reinforcement portion and the handle portion of the at least one handle panel.

2. The carrier of claim 1, wherein the at least one divider reinforcement flap is in at least partial face-to-face contact with the respective at least one divider flap.

3. The carrier of claim 2, wherein the at least one divider reinforcement flap is separably connected to the respective panel of the plurality of panels at a respective tear line.

4. The carrier of claim 3, wherein the at least one divider flap in the front portion of the carrier is a front divider flap foldably connected to the central partition and extending to the front panel, and the at least one divider flap in the back portion of the carrier is a back divider flap foldably connected to the central partition and extending to the back panel.

5. The carrier of claim 4, wherein the at least one divider reinforcement flap is a front divider reinforcement flap in at least partial face-to-face contact with the front divider flap, and the plurality of reinforcement flaps further comprises a back divider reinforcement flap in at least partial face-to-face contact with the back divider flap.

6. The carrier of claim 1, wherein the handle panel is a first handle panel, the handle portion is a first handle portion of the first handle panel, the handle reinforcement portion is a first handle reinforcement portion of the first handle panel, the handle reinforcement flap is a first handle reinforcement flap foldably connected to the first handle panel, the plurality of panels further comprises a second handle panel comprising a second handle portion foldably connected to a second handle reinforcement portion, and the plurality of reinforcement flaps further comprises a second handle reinforcement flap foldably connected to the second handle panel.

7. The carrier of claim 6, further comprising a first handle flap foldably connected to the first handle reinforcement portion and a second handle flap foldably connected to the second handle reinforcement portion, and the handle comprises the first handle panel, the first handle flap, the first handle reinforcement flap, the second handle panel, the second handle flap, and the second handle reinforcement flap.

8. The carrier of claim 1, wherein the plurality of reinforcement flaps further comprises at least one of a front reinforcement flap in at least partial face-to-face contact with the front panel and a back reinforcement flap in at least partial face-to-face contact with the back panel.

9. The carrier of claim 1, wherein the at least one handle panel is a first handle panel and the plurality of panels comprises a second handle panel, the central partition comprises the first handle panel in at least partial face-to-face contact with the second handle panel, each handle panel comprises a respective handle portion foldably connected to a respective handle reinforcement portion, the at least one divider flap in the front portion of the carrier is a front divider flap foldably connected to the central partition and extending to the front panel, the plurality of reinforcement flaps further comprises a back divider flap foldably connected to the central partition and extending to the back panel, the at least one divider reinforcement flap is a front divider reinforcement flap in at least partial face-to-face contact with the front divider flap, and the plurality of reinforcement flaps further comprises a back divider reinforcement flap in at least partial face-to-face contact with the back divider flap, the handle reinforcement flap is a first handle reinforcement flap foldably connected to the first handle panel and the plurality of reinforcement flaps further comprises a second handle reinforcement flap foldably connected to the second handle panel, a front reinforcement flap foldably connected to the front panel, and a back reinforcement flap foldably connected to the back panel.

10. The carrier of claim 1, wherein the at least one divider reinforcement flap provides a voucher that is removable from the interior of the carrier.

11. The carrier of claim 10, wherein the at least one divider reinforcement flap is a front divider reinforcement flap and the voucher is a first voucher that is removable from the interior of the carrier, and the plurality of reinforcement flaps further comprises a back divider reinforcement flap that provides a second voucher that is removable from the interior of the carrier.

12. A blank for forming a carrier for holding a plurality of containers, the blank comprising:

a plurality of panels for extending at least partially around an interior of the carrier formed from the blank, the plurality of panels comprises a front panel, a back panel, a first side panel, a second side panel, and at least one handle panel comprising a handle portion foldably connected to a handle reinforcement portion;

at least one divider flap foldably connected to the at least one handle panel; and a plurality of reinforcement flaps foldably connected to a respective panel of the plurality of panels, the plurality of reinforcement flaps comprises a handle reinforcement flap foldably connected to the at least one handle panel and at least one divider reinforcement flap for being positioned in at least partial face-to-face contact with the at least one divider flap when the carrier is formed from the blank, the handle reinforcement portion and the handle portion of the at least one handle panel and the handle reinforcement flap for being positioned in overlapping relation when the carrier is formed from the blank for at least partially forming a handle such that the handle reinforcement flap is positioned between the handle reinforcement portion and the handle portion of the at least one handle panel.

13. The blank of claim 12, wherein the at least one divider reinforcement flap is for being in at least partial face-to-face contact with the respective at least one divider flap.

14. The blank of claim 13, wherein the at least one divider reinforcement flap is separably connected to the respective panel of the plurality of panels at a respective tear line.

15. The blank of claim 14, wherein the at least one divider flap is a front divider flap foldably connected to the at least one handle panel for being positioned in a front portion of the carrier formed from the blank, and the blank further comprises a back divider flap foldably connected to the at least one handle panel for being positioned in the back portion of the carrier formed from the blank.

16. The blank of claim 15, wherein the at least one divider reinforcement flap is a front divider reinforcement flap for being in at least partial face-to-face contact with the front divider flap, and the plurality of reinforcement flaps further comprises a back divider reinforcement flap for being in at least partial face-to-face contact with the back divider flap.

17. The blank of claim 12, wherein the at least one handle panel is a first handle panel, the handle portion is a first handle portion of the first handle panel, the handle reinforcement portion is a first handle reinforcement portion of the first handle panel, the handle reinforcement flap is a first handle reinforcement flap foldably connected to the first handle panel, the plurality of panels further comprises a second handle panel comprising a second handle portion foldably connected to a second handle reinforcement portion, and the plurality of reinforcement flaps further comprises a second handle reinforcement flap foldably connected to the second handle panel.

18. The blank of claim 17, further comprising a first handle flap foldably connected to the first handle reinforcement portion and a second handle flap foldably connected to the second handle reinforcement portion.

19. The blank of claim 12, wherein the plurality of reinforcement flaps further comprises at least one of a front reinforcement flap foldably connected to the front panel and for being in at least partial face-to-face contact with the front panel and a back reinforcement flap foldably connected to the back panel and for being in at least partial face-to-face contact with the back panel.

20. The blank of claim 12, wherein the at least one handle panel is a first handle panel and the plurality of panels further comprises a second handle panel, each handle panel comprises a respective handle portion foldably connected to a respective handle reinforcement portion, the at least one divider flap in the front portion of the carrier is a front divider flap foldably connected to the first handle panel, the plurality of reinforcement flaps further comprises a back divider flap foldably connected to the second handle panel, the at least one divider reinforcement flap is a front divider reinforcement flap for being in at least partial face-to-face contact with the front divider flap, and the plurality of reinforcement flaps further comprises a back divider reinforcement flap for being in at least partial face-to-face contact with the back divider flap, the handle reinforcement flap is a first handle reinforcement flap foldably connected to the first handle panel and the plurality of reinforcement flaps further comprises a second handle reinforcement flap foldably connected to the second handle panel, a front reinforcement flap foldably connected to the front panel, and a back reinforcement flap foldably connected to the back panel.

21. The blank of claim 12, wherein the at least one divider reinforcement flap provides a voucher that is removable from the blank.

22. The blank of claim 21, wherein the at least one divider reinforcement flap is a front divider reinforcement flap and the voucher is a first voucher that is removable from the blank, and the plurality of reinforcement flaps further comprises a back divider reinforcement flap that provides a second voucher that is removable from the blank.

23. A method of forming a carrier for holding a plurality of containers, the method comprising;

- obtaining a blank comprising a plurality of panels comprising a front panel, a back panel, a first side panel, a second side panel, and at least one handle panel comprising a handle portion foldably connected to a handle reinforcement portion, the blank further comprising at least one divider flap foldably connected to the handle panel, the blank further comprises a plurality of reinforcement flaps foldably connected to a respective panel of the plurality of panels, the plurality of reinforcement flaps comprises at least one divider reinforcement flap and a handle reinforcement flap foldably connected to the at least one handle panel;
- folding the plurality of panels at least partially around an interior of the carrier;
- forming a central partition comprising a respective portion of the at least one handle panel and that divides the carrier into a front portion and a back portion, and positioning the at least one divider flap extending to one of the respective front panel and back panel to divide the respective front portion and back portion into respective compartments for receiving a respective article, the central partition comprises a respective portion of the at least one handle panel;
- positioning the at least one divider reinforcement flap in at least partial face-to-face contact with the at least one divider flap; and
- forming a handle in the central partition comprising overlapping the handle reinforcement portion and the handle portion of the at least one handle panel and the handle reinforcement flap such that the handle reinforcement flap is positioned between the handle reinforcement portion and the handle portion of the at least one handle panel.

24. The method of claim 23, wherein the at least one divider reinforcement flap is in at least partial face-to-face contact with the respective at least one divider flap.

25. The method of claim 24, wherein the at least one divider reinforcement flap is separably connected to the respective panel of the plurality of panels at a respective tear line.

26. The method of claim 25, wherein the at least one divider flap is a front divider flap foldably connected to the central partition and extending to the front panel in the front portion of the carrier, and the blank further comprises a back divider flap foldably connected to the central partition and extending to the back panel in the back portion of the carrier.

27. The method of claim 26, wherein the at least one divider reinforcement flap is a front divider reinforcement flap in at least partial face-to-face contact with the front divider flap, and the plurality of reinforcement flaps further comprises a back divider reinforcement flap in at least partial face-to-face contact with the back divider flap.

28. The method of claim 23, wherein the at least one handle panel is a first handle panel, the handle portion is a first handle portion of the first handle panel, the handle reinforcement portion is a first handle reinforcement portion of the first handle panel, the handle reinforcement flap is a first handle reinforcement flap foldably connected to the first handle panel, the plurality of panels further comprises a second handle panel comprising a second handle portion foldably connected to a second handle reinforcement portion, and the plurality of reinforcement flaps further comprises a second handle reinforcement flap foldably connected to the second handle panel.

29. The method of claim 28, further comprising a first handle flap foldably connected to the first handle reinforcement portion and a second handle flap foldably connected to the second handle reinforcement portion, and the handle comprises the first handle panel, the first handle flap, the first handle reinforcement flap, the second handle panel, the second handle flap, and the second handle reinforcement flap.

30. The method of claim 23, wherein the plurality of reinforcement flaps further comprises at least one of a front reinforcement flap in at least partial face-to-face contact with the front panel and a back reinforcement flap in at least partial face-to-face contact with the back panel.

31. The method of claim 23, wherein the at least one handle panel is a first handle panel and the plurality of panels comprises a second handle panel, the central partition comprises the first handle panel in at least partial face-to-face contact with the second handle panel, each handle panel comprises a respective handle portion foldably connected to a respective handle reinforcement portion, the at least one divider flap in the front portion of the carrier is a front divider flap foldably connected to the central partition and extending to the front panel, the plurality of reinforcement flaps further comprises a back divider flap foldably connected to the central partition and extending to the back panel, the at least one divider reinforcement flap is a front divider reinforcement flap in at least partial face-to-face contact with the front divider flap, and the plurality of reinforcement flaps further comprises a back divider reinforcement flap in at least partial face-to-face contact with the back divider flap, the handle reinforcement flap is a first handle reinforcement flap foldably connected to the first handle panel and the plurality of reinforcement flaps further comprises a second handle reinforcement flap foldably connected to the second handle panel, a front reinforcement flap foldably connected to the front panel, and a back reinforcement flap foldably connected to the back panel.

32. The method of claim 23, wherein the at least one divider reinforcement flap provides a voucher that is removable from the interior of the carrier.

33. The method of claim 32, wherein the at least one divider reinforcement flap is a front divider reinforcement flap and the voucher is a first voucher that is removable from the interior of the carrier, and the plurality of reinforcement flaps further comprises a back divider reinforcement flap that provides a second voucher that is removable from the interior of the carrier.

* * * * *